United States Patent
Nguyen et al.

(10) Patent No.: US 10,666,431 B1
(45) Date of Patent: May 26, 2020

(54) SYSTEMS AND METHODS FOR ENHANCING WEB SECURITY

(71) Applicant: Capital One Services, LLC, McLean, VA (US)

(72) Inventors: Vu Nguyen, Pittsburg, CA (US); Jonathan Guan, Cupertino, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/298,344

(22) Filed: Mar. 11, 2019

(51) Int. Cl.
| | |
|---|---|
| H04L 29/00 | (2006.01) |
| H04L 9/08 | (2006.01) |
| H04L 29/08 | (2006.01) |
| H04L 9/14 | (2006.01) |
| H04L 29/06 | (2006.01) |
| G06F 3/0488 | (2013.01) |

(52) U.S. Cl.
CPC ............... *H04L 9/085* (2013.01); *H04L 9/14* (2013.01); *H04L 63/061* (2013.01); *H04L 67/26* (2013.01); *H04L 67/2842* (2013.01); *G06F 3/0488* (2013.01)

(58) Field of Classification Search
CPC ......... G06F 3/0488; H04L 9/085; H04L 9/14; H04L 63/061; H04L 67/26; H04L 67/2842
See application file for complete search history.

(56) References Cited

U.S. PATENT DOCUMENTS

| | | | | |
|---|---|---|---|---|
| 6,535,855 B1* | 3/2003 | Cahill | .................... | G06Q 20/00 |
| | | | | 340/540 |
| 2009/0117877 A1* | 5/2009 | Yang | ........................ | H04L 63/06 |
| | | | | 455/411 |
| 2009/0164774 A1* | 6/2009 | Sherkin | ................. | H04L 9/3066 |
| | | | | 713/155 |
| 2012/0290830 A1* | 11/2012 | Resch | .................... | H04L 9/0841 |
| | | | | 713/150 |
| 2015/0256336 A1* | 9/2015 | Stiglic | ................... | H04L 9/0822 |
| | | | | 380/281 |
| 2016/0014057 A1 | 1/2016 | Gudla et al. | | |
| 2016/0086400 A1* | 3/2016 | Dumas | ............... | G07C 9/00007 |
| | | | | 340/5.61 |
| 2017/0141926 A1* | 5/2017 | Xu | ......................... | H04L 9/3247 |
| 2017/0339138 A1* | 11/2017 | Lewison | ............... | H04L 9/3239 |
| 2018/0123804 A1* | 5/2018 | Smith | ................... | H04W 76/10 |
| 2018/0167367 A1* | 6/2018 | John | .................... | H04L 63/0428 |
| 2018/0375663 A1* | 12/2018 | Le Saint | ............... | H04L 9/3247 |

(Continued)

FOREIGN PATENT DOCUMENTS

CN 106104486 A 11/2016

*Primary Examiner* — Don G Zhao
(74) *Attorney, Agent, or Firm* — Bookoff McAndrews, PLLC

(57) ABSTRACT

Disclosed are methods, systems, and non-transitory computer-readable medium for enhancing web security. For instance, the method may include transmitting a request to a server, the request including a payload and a service worker public key, the service worker public key corresponding to a service worker private key. The method may also include receiving a push from the server, the push including a server public key that corresponds to a server private key, and receiving a response to the request from the server. The method may also include constructing a shared-secret based on the service worker private key and the server public key, and decrypting the response using the shared-secret.

14 Claims, 4 Drawing Sheets

(56) References Cited

U.S. PATENT DOCUMENTS

| | | | |
|---|---|---|---|
| 2019/0045026 A1* | 2/2019 | Sekharan | H04L 67/32 |
| 2019/0089531 A1* | 3/2019 | Le Saint | H04L 9/14 |
| 2019/0095196 A1* | 3/2019 | Anderson | G06F 8/658 |
| 2019/0141152 A1* | 5/2019 | Alabbas | H04L 67/26 |

* cited by examiner

SYSTEMS AND METHODS FOR ENHANCING WEB SECURITY

TECHNICAL FIELD

Various embodiments of the present disclosure relate generally to systems and methods for enhancing web security and, more particularly, to systems and methods for enhancing web security using a service worker.

BACKGROUND

Conventional web technology (e.g., servers) may not able to reliably and securely identify web traffic. For instance, a server may have no way to differentiate between a good client versus a bad client. An example of a bad client may be proxy interceptor, bot, cross-site scripting, etc. For instance, bad clients may perform Man-in-the-middle (MITM) attacks, Cross-site Request Forgery (CSRF) attacks, Cross-site Scripting (XSS) attacks, or Man-in-the-browser (MITB) attacks.

Moreover, it is common to provide, among other things, functionality for a one-click checkout experience, long-lived tokens, or cookie sessions that may be valid for months. However, such functionality may present a high risk of manipulation or be susceptible to attack by bad clients. Furthermore, two-step authentication may be insufficient to avoid such attacks by bad clients. Therefore, there remains a need for protocols to reliably and securely identify a good (e.g., trustworthy) client.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for enhancing web security.

For instance, a method may include transmitting a request to a server, the request including a payload and a service worker public key, the service worker public key corresponding to a service worker private key; receiving a push from the server, the push including a server public key that corresponds to a server private key; receiving a response to the request from the server; constructing a shared-secret based on the service worker private key and the server public key; and decrypting the response using the shared-secret.

A system may include a memory storing instructions and a cache; and a processor executing the instructions to perform a process. The process may include launching a service worker; using the service worker, forming a secure communication channel with a server associated with the service worker; using the service worker, receiving data over the secure communication channel with the server; and using the service worker, updating the cache based on the received data.

A method may include determining whether a service worker event occurs, the service worker event being associated with a web application, the web application being associated with a domain hosted by a server; in response to determining that the service worker event occurs, launching a service worker associated with the server; using the service worker, forming a secure communication channel with the server by executing a negotiation process; and using the service worker, transmitting and/or receiving data over the secure communication channel with the server according to the service worker event. The negotiation process may include: transmitting a request to the server, the request including a payload and a service worker public key, the service worker public key corresponding to a service worker private key; receiving a push from the server, the push including a server public key that corresponds to a server private key; constructing a shared-secret based on the service worker private key and the server public key; and forming the secure communication channel using the shared-secret.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
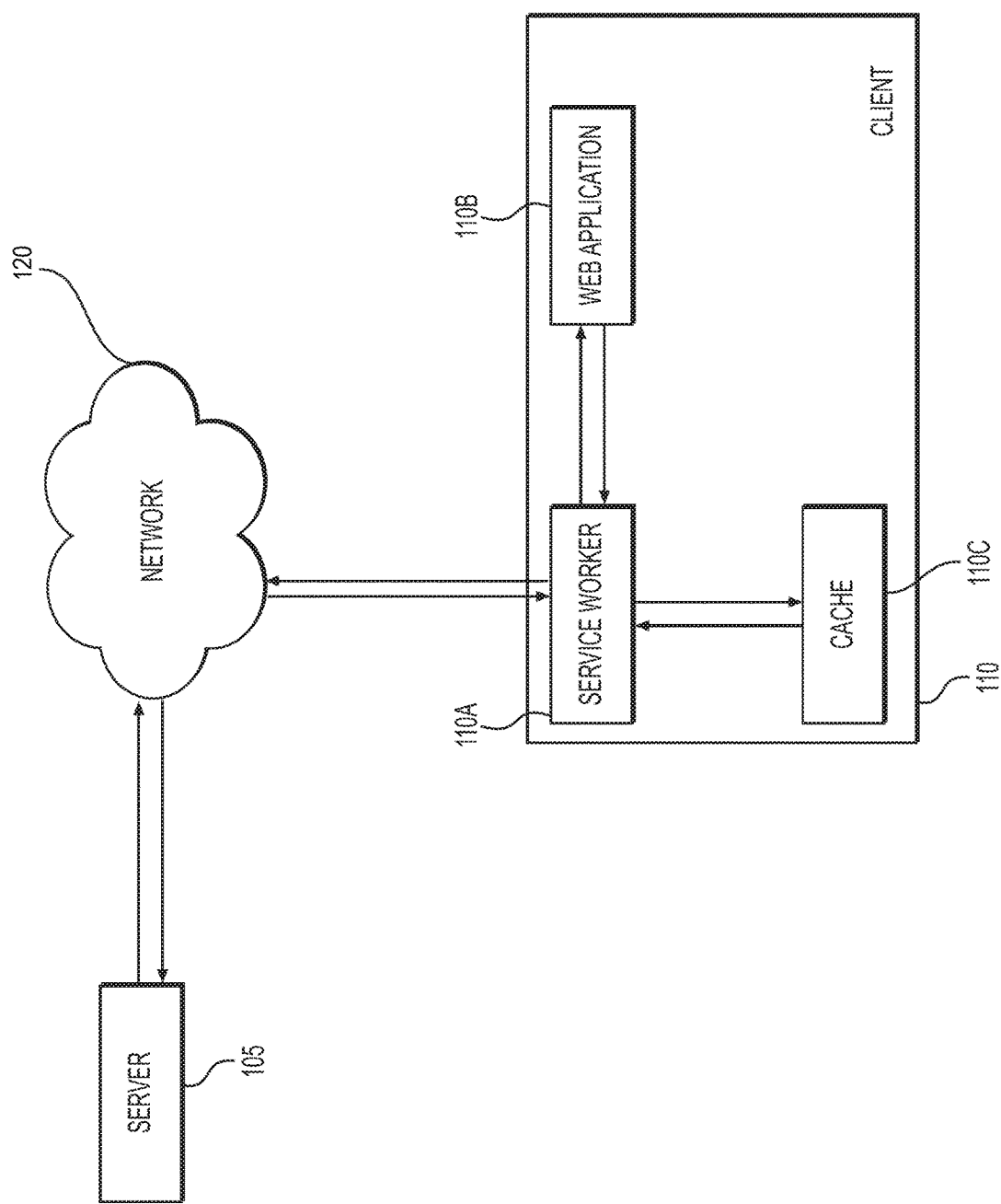
FIG. 1 depicts an exemplary system for enhancing web security, according to one or more embodiments.

Various embodiments of the present disclosure relate generally to systems and methods for enhancing web security using a service worker.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems and methods for enhancing web security using a service worker. As discussed in more detail below, a system of the present disclosure may enforce security by creating a secured communication channel between a client and a server. Specifically, the system of the present disclosure may form a secure communication channel between the server and the client by pushing information to a service worker of the client (e.g., by a web push) to perform a Diffie-Hellman key exchange with the service worker. The service worker may then form a secured communication channel for a web application of the client to/from the server. Furthermore, the server may verify the service worker of the client to identify and validate the client, to thereby ensure that data is delivered securely to the correct client. For instance, to access data communicated between the server and the client, an attacker may need to obtain all three of: a server public key (which may be delivered through a push notification, with or without service worker validation), a client private key (which may be stored in a memory on the client), and an encrypted message (e.g., an encrypted server response). However, as the service worker is validated/verified and/or the server public key is transmitted by push notification, the system of the present disclosure may help prevent MITM, MITB, and XSS attacks. Moreover, the server may reject all requests if not from a registered service worker, thereby helping prevent MITM, MITB, and XSS attacks.

FIG. 1 depicts an exemplary system 100 for enhancing web security, according to one or more embodiments. The system 100 may include a server 105 and a client 110. The client 110 and the server 105 may be connected via a network 120, using one or more standard communication protocols. The network 120 may be one or a combination of the internet, a local network, or other network. The client 110 and the server 105 may transmit and receive messages from each other across the network 120.

Figure 4:
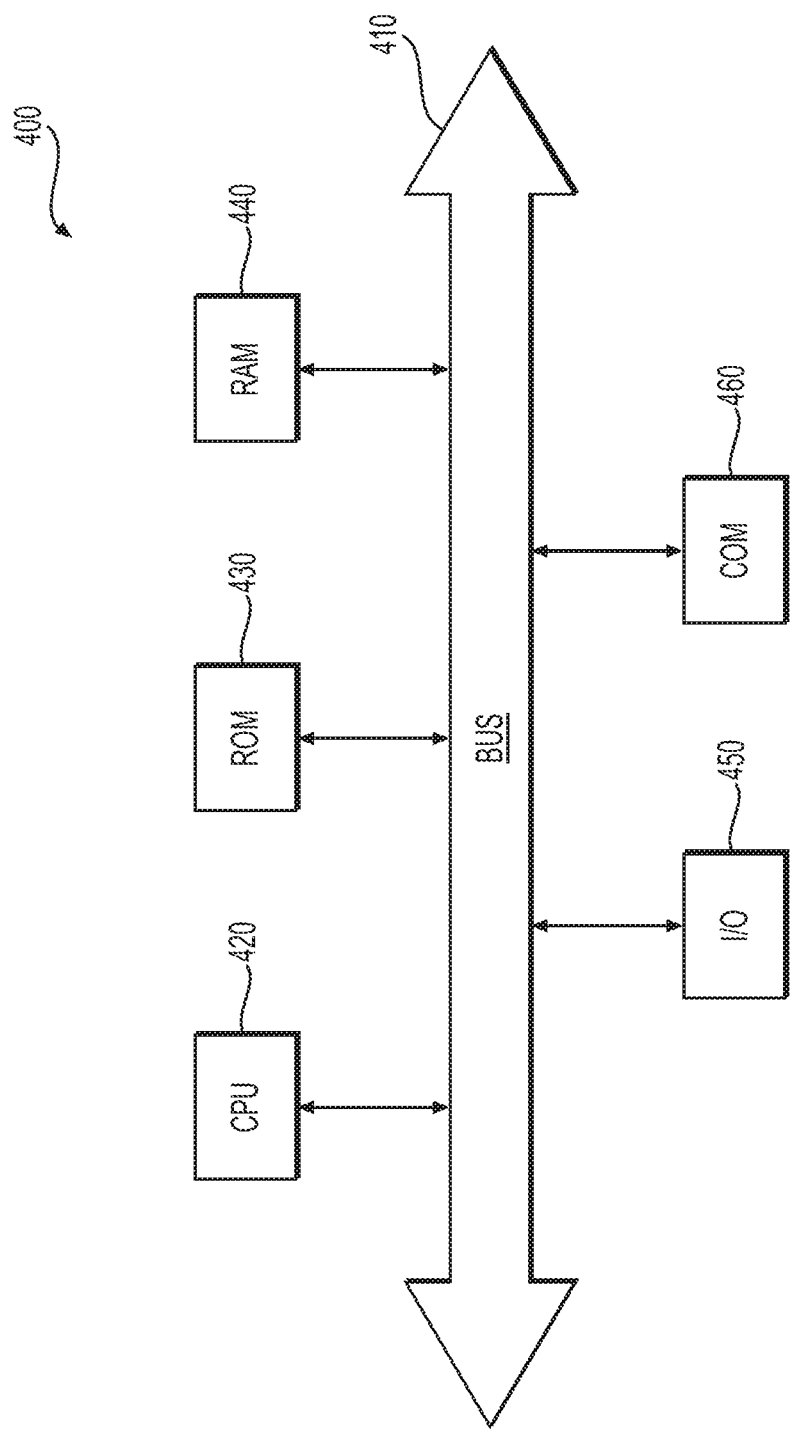
FIG. 4 depicts an example system that may execute techniques presented herein.

The client 110 may be a computing device (e.g., a computer, a cell phone, a tablet, etc.) as discussed further in connection with FIG. 4. As such, client 110 may include at least a display/UI, a network interface, a processor, and a memory. The client 110 may execute, by the processor, an operating system (O/S) and at least one application (each stored in the memory). Specifically, one application executable by the processor of the client 110 may be a browser application. The browser application may generate one or more graphic user interfaces (GUIs) based on instructions/information stored in the memory and/or instructions/information received from the server 105, and/or instructions/information received by user inputs into the display/UI of client 110.

Specifically, the browser application may implement a browser user interface, one or more web application(s) 110B, a cache 110C, and/or one or more service worker(s) 110A. The browser user interface may be a sub-application of the browser application, and the browser user interface may be stored in the memory of the client 110. The one or more web application(s) 110B may be sub-applications of the browser application and/or may be received from servers, such as the server 105. The one or more service worker(s) 110A may be sub-applications of the browser application, and the one or more service worker(s) 110A may be initialized by servers on the client 110, such as the server 105.

The web application(s) 110B may execute processes, according to web application program(s) for each of the web application(s) 110B, to create interactive web pages, dynamically update data, interact with temporary/local storage (such as the cache 110C or other data storage in the memory of the client 110), generate UIs for interaction between a user and servers 105 for the web application(s) 110B, send requests to the servers 105, retrieve data from servers 105, and/or provide remote access for server-side application(s). The web application(s) 110B may be composed of program code in one or more languages, such as scripting languages like JavaScript/VBScript, HTML, CSS, AJAX, jQuery etc.

The web application program(s) may be programs defined by hosting entities of the servers, such as server 105. The web application program(s) may be transmitted to the client 110 to be stored on the client 110, e.g., in the memory of the client 110. The web application program(s) may define how information/data is displayed in GUIs of the browser user interface, and the web application program may provide various functionalities according to program functions as defined by the hosting entities.

The service worker(s) 110A may execute processes, according to service worker program(s) for each of the service worker(s) 110A, to control network requests for the web application(s) 110B (e.g., to transmit messages to and receive messages from a server, such as the server 105), and cache those messages in the cache 110C to, e.g., improve performance and provide offline access to cached content. The service worker(s) 110A may be composed of program code in one or more languages, such as scripting languages like JavaScript/VBScript, HTML, CSS, AJAX, jQuery etc.

Furthermore, the service worker(s) 110A may, according to the service worker program(s), provide notifications (e.g., based on a notifications API), provide push messaging (e.g., based on a push API), provide background sync (e.g., based on a background sync API), and/or provide channel messaging (e.g., based on a channel messaging API) to other workers (e.g., web workers) of the browser application. The service worker(s) 110A may control network requests for all web pages within specific service worker scope(s). The service worker(s) 110A may perform processes in response to service worker event(s). Service worker event(s) may include message events and functional events. The message events may correspond to receiving messages from other scripts (e.g., web workers). The functional events may include a fetch event, a push event, and/or a sync event.

The service worker program(s) may be programs defined by hosting entities of the servers, such as server 105. The service worker program(s) may be transmitted to the client 110 to be stored on the client 110, e.g., in the memory of the client 110. The service worker program(s) may define how information/data is stored on client 110 (e.g., in cache 110C) and how network requests are handled between the web application(s) 110B and the servers, such as server 105.

The browser user interface may generate GUIs for a browser window and perform general functions of a browser. The browser user interface may display GUIs for webpages executed based on HTML, CSS, and/or scripts, such as JavaScript, but one skilled in the art would recognize that this may be accomplished by other methods, such as XML and Android programming languages or Objective-C/Swift, etc. In response to a user input to the browser user interface to request a domain (e.g., example.com) that executes a server-side application of a web application 110B, the browser application may execute the web application 110B (e.g., of the one or more web applications 110B).

The display/UI of the client 110 may be a touch screen or a display with other input systems (e.g., mouse, keyboard, etc.), and may display the GUIs generated by the browser application. The network interface of the client 110 may be an TCP/IP network interface for, e.g., Ethernet or wireless communications with the network 120. The processor of the client 110, while executing the browser application, may receive user inputs from the display/UI of the client 110, and perform actions or functions in accordance with the browser application.

The server 105 may be a computing device (e.g., a computer, a system of computers (e.g., rack server(s)), a cloud service computer system, etc.) as discussed further in connection with FIG. 4. As such, server 105 may include a display/UI, a processor, a memory, and/or a network interface. The server 105 may execute, by the processor of the server 105, an operating system (O/S) and at least one server-side application (each stored in the memory of the server 105). The display/UI of the server 105 may be a touch screen or a display with other input systems (e.g., mouse, keyboard, etc.) for an operator of the server 105 to control the functions of the server 105. The network interface of the server may be a TCP/IP network interface for, e.g., Ethernet or wireless communications with the network 120.

Server-side application(s) of servers, such as the server 105, may receive requests from clients, process the requests, interact with other servers/storages, interact with databases (e.g., query the database), generate responses, and transmit responses to the clients. The server-side application(s) may be composed of program code in one or more languages, such as PHP, C#, C++, Java, Python, Ruby on Rails, etc.

Moreover, the service worker program(s) and the server-side application(s) may perform a negotiation process to ensure that communication between clients, such as the client 110, and servers, such as the server 105, are sufficiently secure to prevent MITM, MITB, and XSS attacks. The service worker program(s) may determine that all messages to/from the web application(s) 110B are within the service worker scope(s), such that all messages are handled by corresponding service worker program(s) to enforce encrypted channels. For instance, the negotiation process may be performed by the server 105 with the service worker 110A of the client 110, for messages to/from the web application 110B of the client 110.

The negotiation process may perform a symmetric-key algorithm to create encrypted channels. For instance, the symmetric-key algorithm may create a shared-secret by a Diffie-Hellman key exchange. The shared-secret may be generated according to various encryption algorithms, such as Elliptic Curve Diffie-Hellman key exchange (ECDH) and/or Hash-Based Message Authentication Code (HMAC)-Based Extract-and-Expand Key Derivation Function (HKDF).

The Diffie-Hellman key exchange may require that the server 105 transmit a server public key via a push message to the service worker 110A. Such a push message, e.g., a web push via a push service from the server 105, may be encrypted such that only the correct receiving party (e.g., the service worker 110A of the client 110) may decrypt the server public key. As such, the server public key is not exposed to third parties between the server 105 and the client 110. Specifically, as third parties cannot access the server public key (because it may be encrypted between the server 105 and the client 110) and/or the client private key (because it may be securely stored in the memory on the client 110), the third parties cannot decrypt an encrypted message that is viewed/monitored/examined by the third parties.

Moreover, before the negotiation process, as a first stage (e.g., before exchanging of public keys) of the negotiation process, and/or periodically, the service worker 110A and the server 105 may perform a verification process to verify the service worker 110A. The verification process may confirm the service worker 110A is a registered service worker associated with the server 105, and confirm the service worker 110A has not been altered in an unauthorized manner.

Figure 2:
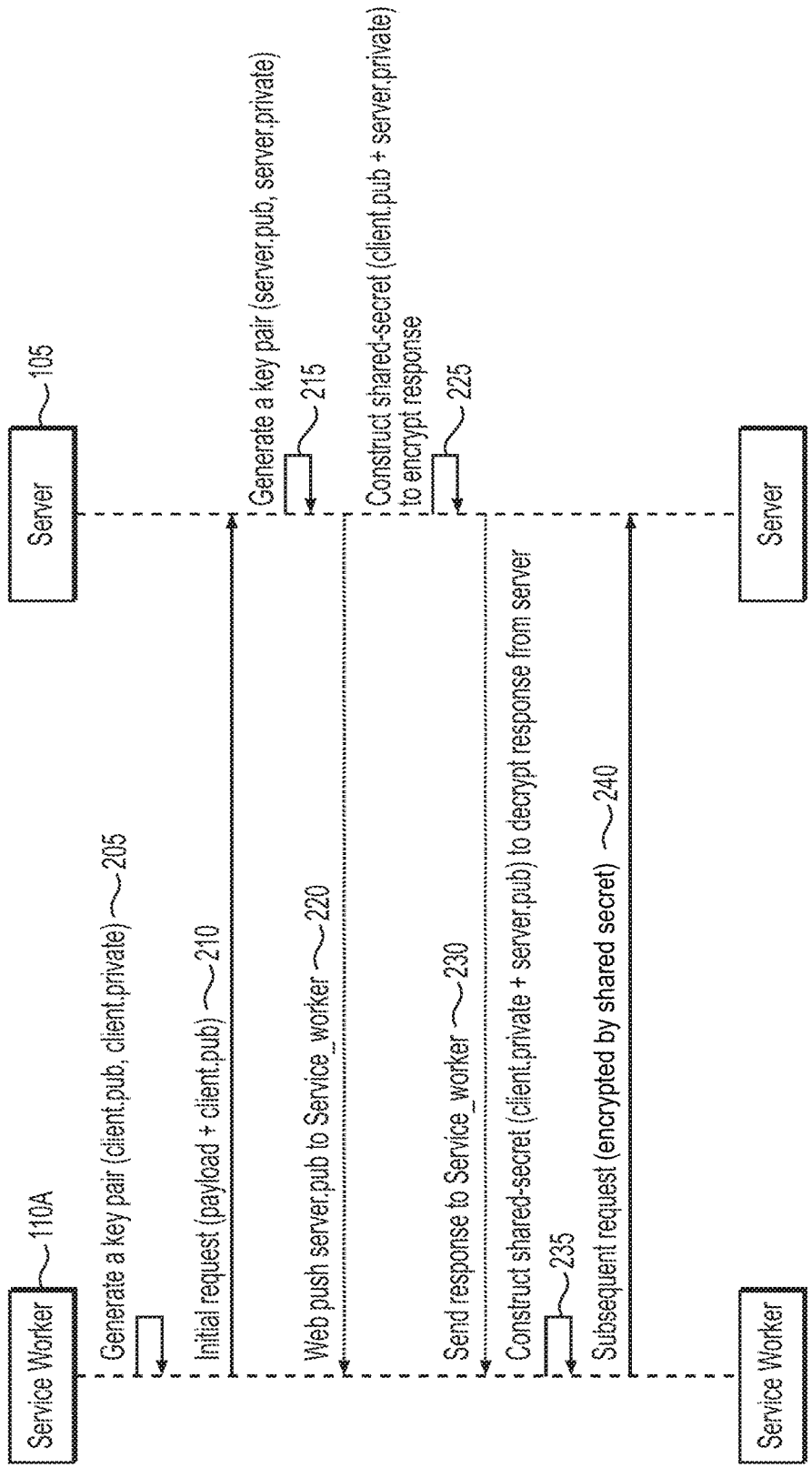
FIG. 2 depicts an exemplary process for enhancing web security, according to one or more embodiments.

FIG. 2 depicts an exemplary process 200 for enhancing web security, according to one or more embodiments. The process 200 may correspond to the negotiation process between a service worker 110A of a client 110 and a server 105. For instance, the process 200 may be performed by the service worker 110A of the client 110 by executing the browser application and by the server-side application(s) of the server 105. The service worker 110A may start the process 200 to generate a key pair that includes a client public key and a client private key (step 205) (depicted as (client.pub, client.private) in FIG. 2). The client public key may correspond to a service worker public key, and the client private key may correspond to a service worker private key.

The service worker 110A may then transmit an initial request to the server 105 (step 210). The initial request may include a payload and the client public key. The payload may be, for instance, a request for a resource.

The server 105 may receive the initial request from the service worker 110A. The server 105 may generate a key pair that includes a server public key and a server private key (step 215) (depicted as (server.pub, server.private) in FIG. 2). The server 105 may generate the server key pair in response to the initial request or the server 105 may generate the server key pair before receiving the initial request.

The server 105 may generate a shared-secret based on the client public key and the server private key. The server 105 may generate the shared-secret in response to receiving the initial request from the service worker 110A.

The server 105 may generate a response to the payload of the initial request. The server 105 may encrypt the response using the shared-secret (step 225). The server 105 may transmit the encrypted response to the service worker 110A (step 230).

The server 105 may transmit a push message to the service worker 110A (step 220). The push message may include the server public key. The push message may be transmitted via a push service to be transmitted to the service worker 110A as a web push.

The server 105 may transmit the push message before, after, or at a same time as the server 105 transmits the encrypted response. In one aspect of the disclosure, the server 105 may transmit the push message after the server 105 transmits the encrypted response; for instance, the server 105 may transmit the push message in response to receiving an acknowledgment that the encrypted response was received by the service worker 110A. In another aspect of the disclosure, the server 105 may transmit the push message before the server 105 transmits the encrypted response; for instance, the server 105 may transmit the push message, and, in response to receiving an acknowledgment that the push message was delivered to the service worker 110A (e.g., by receiving an acknowledgment from the push service), transmit the encrypted response to the service worker 110A.

The service worker 110A may receive the push message from the server 105 (e.g., through the push service), and receive the encrypted response from the server 105. As discussed above, the push message may be received before, after, or at a same time as the encrypted response.

The service worker 110A may construct a shared-secret based on the client private key and the server public key (from the push message). The shared-secret based on the client private key and the server public key may correspond to the shared-secret based on the client public key and the server private key generated by the server 105 (collectively, "shared-secret"). The service worker 110A may construct the shared-secret in response to receiving the push message. The service worker 110A may decrypt the encrypted response using the shared-secret (step 235).

Subsequent messages between the service worker 110A and the server 105 may be encrypted and decrypted using the shared-secret. For instance, as depicted in step 240 of FIG. 2, subsequent requests may be encrypted by the service worker 110A using the shared-secret, and then transmitted to the server 105. Therefore, the service worker 110A and the server 105 may form an encrypted channel using the shared-secret. The encrypted channel may also be referred to as a secure communication channel.

Furthermore, the service worker 110A may store the server public key and/or the shared-secret in, e.g., the cache 110C or the memory of the client 110. The server 105 may store the client public key and/or the shared-secret in the memory of the server 105.

Generally, each new session may proceed as described in the process 200. A session may be a predetermined time frame, number of messages, a predetermined time frame between messages, etc.

Alternatively, once the service worker 110A and the server 105 have performed the process 200 a first time, the service worker 110A and the server 105 may proceed to form the encrypted channel using the shared-secret without performing the entire method of the process 200. For instance, the service worker 110A and the server 105 may proceed to form the encrypted channel using the shared-secret without proceeding through steps 205-235, and specifically steps 210, 220, 225, and 235.

In one aspect of the disclosure, the service worker 110A may be verified by performing the verification process with the server 105, and then the encrypted channel may be used to transmit messages. In another aspect of the disclosure, the service worker 110A and the server 105 may periodically re-perform the process 200. For instance, the shared-secret, client public key, and/or server public key may be valid for a predetermined period (or until a set time), and after the predetermined period (or set time) has elapsed, the process 200 may be performed by the service worker 110A and the server 105 immediately or in response to a request to transmit a message. In another aspect of the disclosure, the service worker 110A and the server 105 may re-perform the process 200 in response a request from one of the service worker 110A or the server 105 to the other to re-perform the process 200, if the one of the service worker 110A or the server 105 determines a risk, change in authentication, change in settings, etc.

Figure 3:
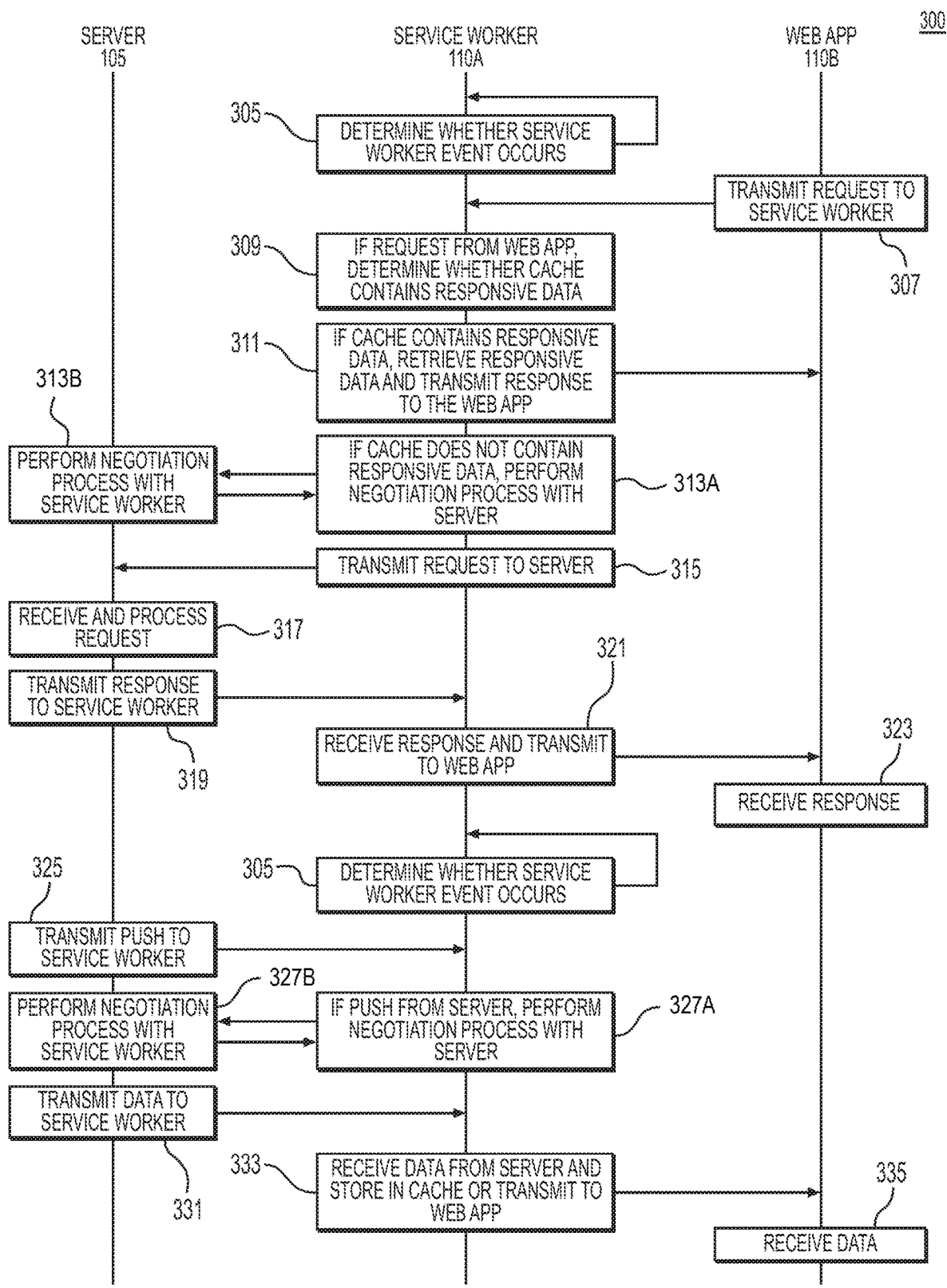
FIG. 3 depicts a flowchart for enhancing web security, according to one or more embodiments.

FIG. 3 depicts a flowchart 300 for enhancing web security, according to one or more embodiments. The flowchart 300 may depict a process of how a server 105 interacts with the service worker 110A of the client 110, and the service worker 110A interacts with the web application 110B (displayed as web app 110B in FIG. 3). For instance, the flowchart 300 may be performed by the service worker 110A and the web application 110B of the client 110 by executing the browser application and by the server-side application(s) of the server 105. The service worker 110A may start the process depicted in flowchart 300 to determine whether a service worker event occurs (block 305). If the service worker 110A determines that a service worker event has not occurred, the service worker may wait until a service worker event occurs. If the service worker determines that a service worker event has occurred, the service worker 110A may proceed to block 309, if a request came from the web application 110B (e.g., a request type event), or the service worker 110A may proceed to block 327A, if a push message came from the server 105 (e.g., a function type event). For instance, the web application 110B may transmit a request to the service worker 110A (block 307) or the server 105 may transmit a push message to the service worker 110A (block 325).

In response to receiving the request from the web application 110B (block 307), the service worker 110A may determine the service worker event occurs, and the service worker 110A may start a service worker program. Specifically, the service worker program may determine the request came from the web application 110B, and determine whether a cache (such as the cache 110C) contains responsive data (block 309). Responsive data may be data associated with the web application 110B that is partially or fully responsive to the request. For instance, the cache may contain only a portion (up to all) data that is relevant/necessary for a response to the request.

The service worker 110A may then, if the cache contains responsive data, retrieve the responsive data from cache, generate a response, and transmit the response to the web application 110B (block 311). If the cache does not contain responsive data, the service worker may perform a negotiation process with the server (block 313A), and the server 105 may perform the negotiation process with the service worker 110A (block 313B). The negotiation process may correspond to the process 200 discussed above with respect to FIG. 2 (either the full process or only forming the encrypted channel). After the negotiation process, or as a payload of an initial request of the negotiation process, the service worker 110A may transmit a request to the server 105 (block 315). The request transmitted by the service worker 110A may be the same as the request from the web application 110B (e.g., the same as the request of block 307) or may be based on the request from the web application 110B (e.g., the transmitted request is modified/transformed according to the service worker program). If the transmitted request is transmitted after the negotiation process, the request may be encrypted using a shared-secret.

The server 105 may receive and process the request from the service worker 110A (block 317). The processing of the request may include decrypting and/or performing a process according to the server-side application(s) to obtain a response. The server 105 may transmit the response to the service worker 110A (block 319).

The service worker 110A may receive the response from the server 105 (block 321). Additionally, the service worker 110A may transmit the response to the web application 110B or transmit a response based on the response from the server 105 (e.g., modify, transform, supplement, etc.), according to the service worker program. The web application 110B may receive the response from the service worker 110A (block 323).

In the case that the responsive data was only partially responsive, the service worker 110A may perform the process as described through blocks 313A, 313B through block 323, in parallel to transmitting the partial response to the web application 110B. Therefore, the request from the web application 110B may be fully replied to by the service worker 110A in a supplemental manner, while data in the cache may already have been transmitted the web application 110B.

In response to receiving the push message from the server 105 (block 325), the service worker 110A may determine the service worker event occurs, and the service worker 110A may start the service worker program. Specifically, the service worker program may determine the request came from the web application 110B, and perform a negotiation process with the server (block 327A). The server 105 may perform the negotiation process with the service worker 110A (block 327B). The negotiation process may correspond to the process 200 discussed above with respect to FIG. 2 (either the full process or only forming the encrypted channel). After the negotiation process, or as an encrypted message corresponding to the encrypted response of block 230 of FIG. 2, the server 105 may transmit data to the service worker 110A (block 331).

The service worker 110A may receive the transmitted data from the server 105. The service worker 110A may store the data in the cache or transmit the data to the web application 110B, according to the service worker program (block 333). In the case the service worker 110A transmits the data to the web application 110B, the web application 110B may receive the data from the service worker 110A (block 335).

Generally, in the above description of FIG. 3, the responses and requests to/from the web application 110B, are processed according to a web application program. The web application program may cause a browser user interface of the client 110 to display a web application GUI for the web application, with or without updates, according to the web application program. The browser user interface may receive user inputs, and transmit the user inputs to the web application 110B. The web application program may perform processes internally based on the user inputs, or the web application program may transmit the requests to the service worker 110A (or the service worker 110A may intercept the request so as to handle the requests), according to the web application program. The web application 110B may receive responses from the service worker 110A, and the web application program may process the responses, which may or may not result in an update to the web application GUI for the web application 110B. If the process of the responses triggers an update, the web application program may transmit the update to the browser user interface. The browser user interface may display an updated web application GUI based on the update.

FIG. 4 depicts an example system that may execute techniques presented herein. FIG. 4 is a simplified functional block diagram of a computing device (e.g., computer) that may be configured to execute techniques described herein, according to exemplary embodiments of the present disclosure. Specifically, the computer (or "platform" as it may not a be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for enhancing web security executed by a service worker, the method comprising:
    performing a verification process with a server to verify the service worker by:
        confirming the service worker is a registered service worker associated with the server, and
        confirming the service worker has not been altered in an unauthorized manner;
    transmitting a request to the server, the request including a payload and a service worker public key, the service worker public key corresponding to a service worker private key;
    receiving a push from the server, the push including a server public key that corresponds to a server private key;
    receiving a response to the request from the server;
    constructing a shared-secret based on the service worker private key and the server public key; and
    decrypting the response using the shared-secret.

2. The method of claim 1, wherein the method further includes, before the transmitting the request to the server:
    generating the service worker public key and the service worker private key.

3. The method of claim 1, wherein the push from the server is performed using a web push process to the service worker.

4. The method of claim 3, wherein the web push process encrypts the push using a content encryption key, and the method further includes decrypting the push.

5. The method of claim 1, wherein the response from the server is encrypted using the shared-secret generated by the server using the server private key and the service worker public key.

6. A system for enhancing web security, the system comprising:
    a memory storing instructions and a cache; and
    a processor executing the instructions to perform a process including:
        launching a service worker;
        using the service worker, forming a secure communication channel with a server associated with the service worker by executing a negotiation process, wherein the negotiation process includes:
            performing a verification process with the server to verify the service worker by:
                confirming the service worker is a registered service worker associated with the server, and
                confirming the service worker has not been altered in an unauthorized manner;
            transmitting a request to the server, the transmitted request including a payload and a service worker public key, the service worker public key corresponding to a service worker private key;
            receiving a push from the server, the push including a server public key that corresponds to a server private key;
            constructing a shared-secret based on the service worker private key and the server public key; and
            forming the secure communication channel using the shared-secret;
        using the service worker, receiving data over the secure communication channel with the server; and
        using the service worker, updating the cache based on the received data.

7. The system of claim 6, wherein the push from the server is performed using a web push process to the service worker.

8. The system of claim 6, wherein the process further includes:
    using a browser user interface, displaying a graphical user interface (GUI);
    using the browser user interface, obtaining a first user input for a web application associated with a domain hosted by the server;
    using the browser user interface, displaying a web application GUI for the web application;
    using the browser user interface, obtaining a second user input to the web application GUI;
    using the browser user interface, transmitting the second user input to the web application; and
    using the web application, transmitting a request to the service worker based on the second user input.

9. The system of claim 8, wherein the process further includes:
    using the service worker, determining whether the cache contains responsive data to generate a response to the transmitted request.

10. The system of claim 9, wherein the process further includes:
    using the service worker, in response to determining that the cache does not contain responsive data, fetching the response from the server over the secure communication channel with the server; and
    using the service worker, transmitting the response to the web application.

11. The system of claim 10, wherein the process further includes:
    using the web application, processing the response to obtain an update;
    using the web application, transmitting the update to the browser user interface; and using the browser user interface, displaying an updated web application GUI based on the update.

12. The system of claim 9, wherein the process further includes:
   using the service worker, in response to determining that the cache does contain responsive data, fetching the response from the cache based the transmitted request; and
   using the service worker, transmitting the response to the web application.

13. The system of claim 12, wherein the process further includes:
   using the web application, processing the response to obtain an update;
   using the web application, transmitting the update to the browser user interface; and
   using the browser user interface, displaying an updated web application GUI based on the update.

14. A method for enhancing web security, the method comprising:
   determining whether a service worker event occurs, the service worker event being associated with a web application, the web application being associated with a domain hosted by a server;
   in response to determining that the service worker event occurs, launching a service worker associated with the server;
   using the service worker, forming a secure communication channel with the server by executing a negotiation process, the negotiation process including:
      performing a verification process with a server to verify the service worker by:
         confirming the service worker is a registered service worker associated with the server, and
         confirming the service worker has not been altered in an unauthorized manner;
      transmitting a request to the server, the request including a payload and a service worker public key, the service worker public key corresponding to a service worker private key;
      receiving a push from the server, the push including a server public key that corresponds to a server private key;
      constructing a shared-secret based on the service worker private key and the server public key; and
      forming the secure communication channel using the shared-secret; and
   using the service worker, transmitting and/or receiving data over the secure communication channel with the server according to the service worker event.

* * * * *